July 14, 1931. C. W. MABEY 1,814,942
DOUBLE ELECTRIC TOASTER
Filed Jan. 20, 1930 2 Sheets-Sheet 1

July 14, 1931.   C. W. MABEY   1,814,942
DOUBLE ELECTRIC TOASTER
Filed Jan. 20, 1930   2 Sheets-Sheet 2

INVENTOR,
Charles W. Mabey
By
Minturn & Minturn
Attorneys.

Patented July 14, 1931

1,814,942

UNITED STATES PATENT OFFICE

CHARLES W. MABEY, OF INDIANAPOLIS, INDIANA, ASSIGNOR TO MABEY ELECTRIC AND MANUFACTURING COMPANY, OF INDIANAPOLIS, INDIANA, A CORPORATION OF INDIANA

DOUBLE ELECTRIC TOASTER

Application filed January 20, 1930. Serial No. 421,879.

The object of this invention is to provide an electric bread toaster adapted to toast both sides of two slices of bread or both sides of two sandwiches at once. A further object is to make the hot-plates easily movable apart from each other for the placing and removal of the bread before and after toasting, and to utilize the weight of the upper plates in contacting them positively against the slices of bread.

Another object is to make the hot plates swingingly adjustable to conform to angular variations of the bread when cut thicker on one edge than on the other.

The object also is to make a toaster which will be pleasing in appearance, inexpensive to manufacture, simple in operation, durable and easy of repair.

I accomplish the above, and other objects which will hereinafter appear, by the means illustrated in the accompanying drawings, in which—

Fig. 4, is a vertical section on the line 4—4 of Fig. 2, showing the spread apart positions of the hot-plates in dotted lines, and in toasting position in full lines, with two bread sandwiches toasting between them.

Like characters of reference indicate like parts in the several views of the drawings.

Figure 1:
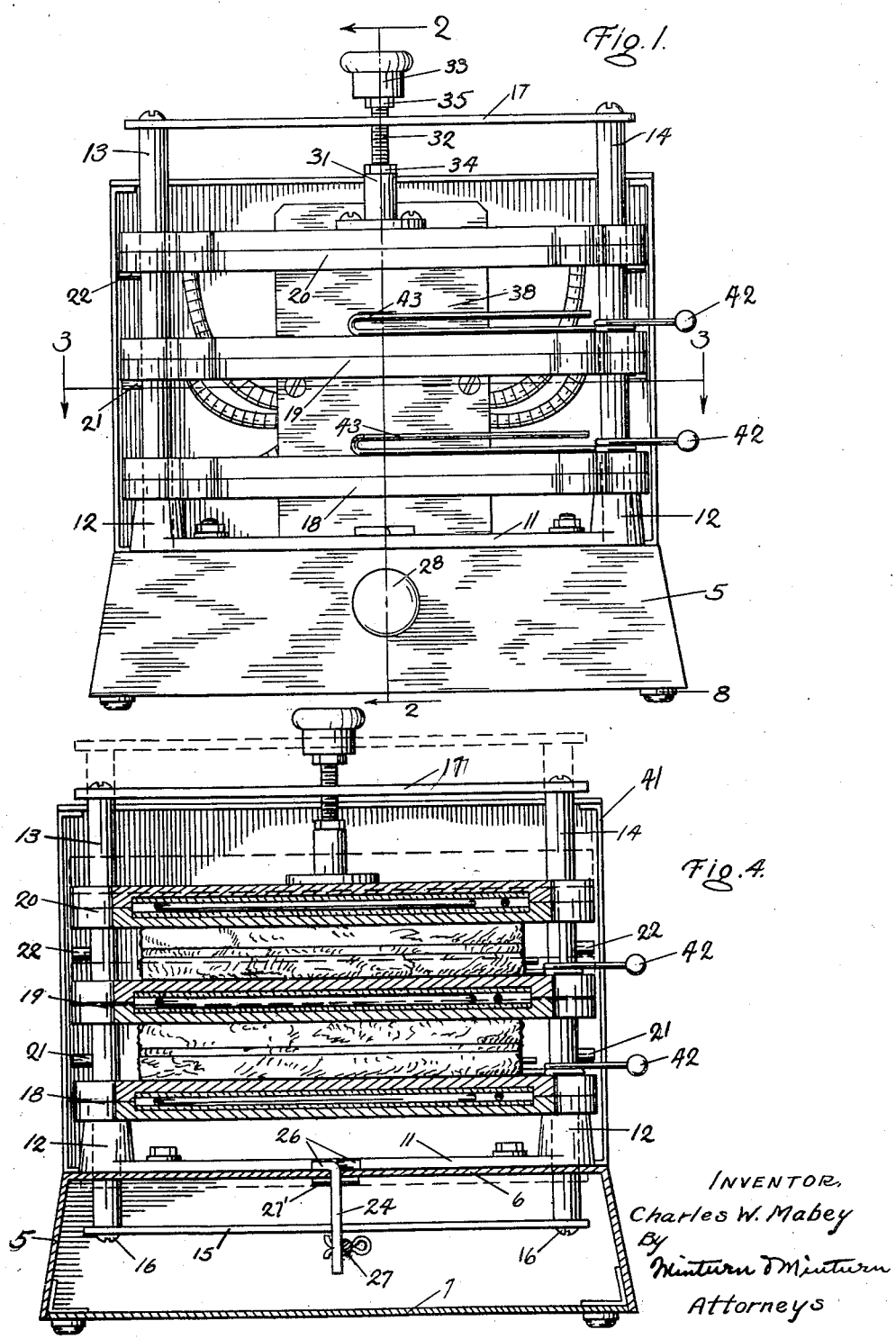
Fig. 1, is a front elevation of my improved toaster with hot-plates spread apart ready for the placing of the slices of bread.
Figure 2:
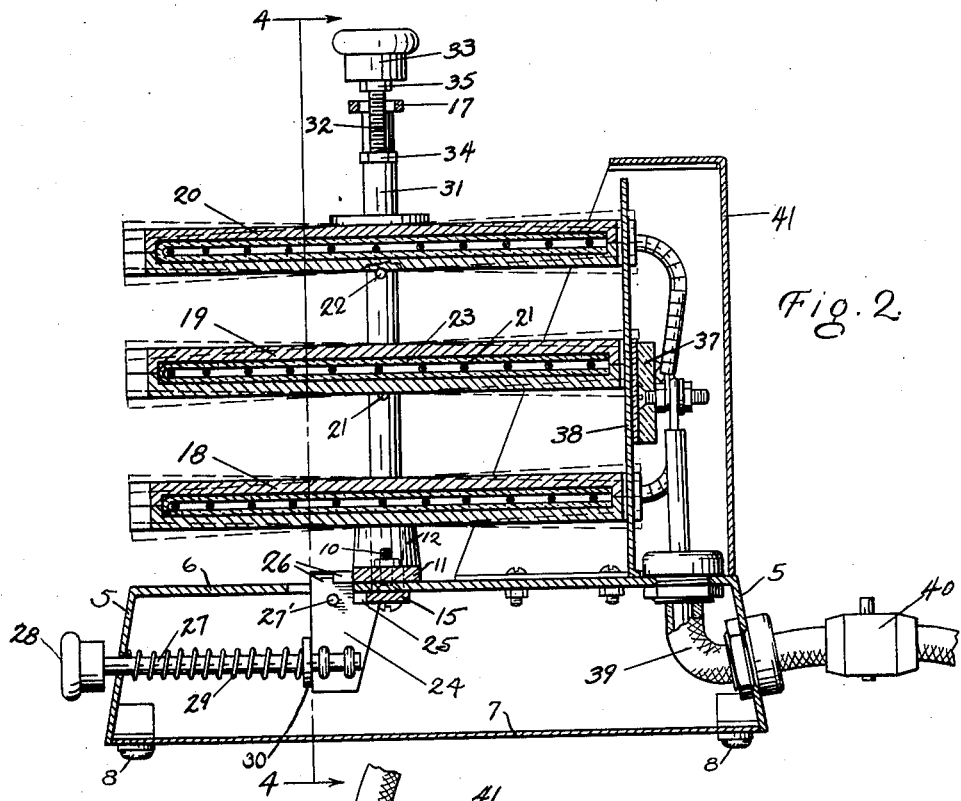
Fig. 2, is a vertical section on the line 2—2 of Fig. 1, with the hot plates in the same spread apart positions.

The base is here shown as a truncated pyramid, having sides 5, top 6 and a bottom 7, retained by screws 8 and removable for access to the hollow interior.

Assembled upon the top 6, and secured thereto by bolts 10, is a bar 11 having end bosses 12, 12, with vertical holes for the passage therethrough of respective posts 13 and 14. The holes register with corresponding holes in the top 6, and the posts extend below the top and are united with each other by a horizontal bar 15, which is attached to the posts by screws 16. The top ends of the posts are similarly connected and spaced apart by a horizontal bar 17. The vertical holes in bosses 12, 12, are elongated front and rear, as shown by dotted lines around the post 13 in Fig. 3, to permit of a swinging or rocking adjustment of the posts.

Positioned by the posts 13 and 14 are three hot-plates 18, 19 and 20, alike in construction. They are each formed by two horizontally separable metal parts which are generally square in shape, recessed in adjacent faces to form receptacles for electric resistance wires 21, insulated where they enter by insulation 22, and above and below from the two metal parts by sheet insulation 23. The parts have a pair of front and rear corner ears by which the parts are joined by screws 25'. See Fig. 3.

Figure 3:
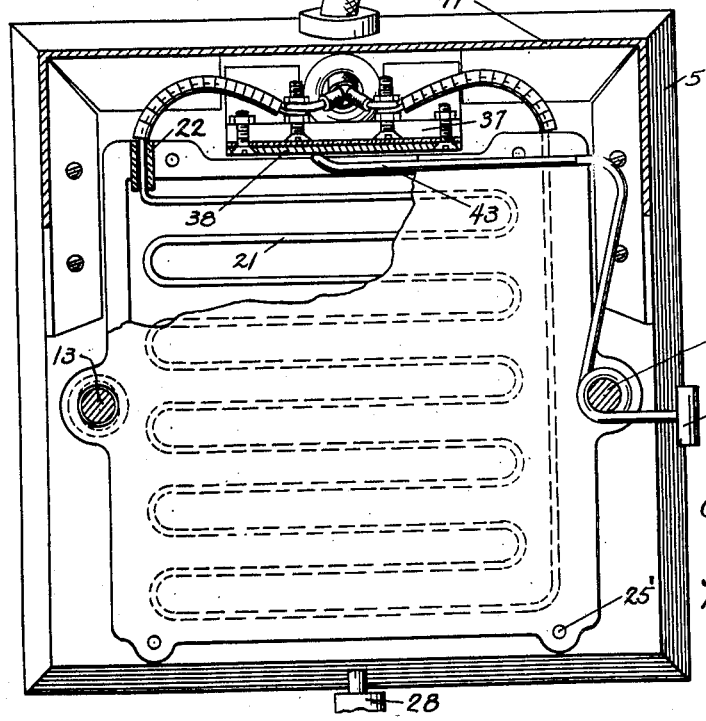
Fig. 3, is a horizontal section on the line 3—3 of Fig. 1, looking down, parts being broken away to show underlying details.

Each of the parts also has diametrically opposite middle ears 36, with holes therethrough for the passage of the respective posts 13 and 14, with a very loose fit, as shown by the double line around post 13 in Fig. 3 so made in order to provide for a rocking adjustment vertically of the hot-plates.

The lowest hot-plate 18 rests upon the tops of the bosses 12, 12, and is not raised or lowered, but the other two plates 19 and 20 are movable vertically for the proper introduction of bread slices, or sandwiches, between them and for their removal when toasted. To accomplish this, laterally extending pins 21, 21, are seated in the respective posts 13 and 14, between hot-plates 18 and 19, at distances up from the lower ends of the posts, as will support the plate 19, when lifted by pins 21, 21, high enough above plate 18, with the bar 15 against top 6, to allow the free insertion between the plates of the thickest, usual, slice of bread or sandwich.

Additional lateral pins 22, 22, are seated in posts 13 and 14, to lift the top hot-plate 20 sufficiently for the insertion between it and plate 19, of the thickest average slice of bread or sandwich.

The posts are held in their raised positions for loading, by a latch-plate 24, which slides in a slot in top plate 6, toward and from the bar 15, and has a shoulder 25, formed by notching the latch-plate 24, to slide under the bar and support it in the raised position of the bar. The latch-plate has a pair of oppositely turned tongues 26, 26, on top of plate 6, and supports a cross pin 27', under the plate. The edge of the latch-plate under shoulder 25, is sloped to cause the bar 15 to automatically push the latch-plate back as the bar is raised against it. A push-rod 27 is fastened to the latch-plate and extends front through wall 5 and terminates with a knob 28 for manual movement of the push-rod. A spring 29 wound around the push-rod 27 expands between the wall 5 and a collar 30 on the rod and normally presses the latch-plate toward the bar 15.

Secured to the top of the top-hot-plate 20 is a post 31, which has a threaded hole in from its upper end which receives a screw 32. The latter passes up and through a hole in the top cross bar 17, and terminates with a knob 33. A lock-nut 34 is screwed down against the post 31, and a lock-nut 35 is screwed against knob 33. The hole in bar 17, for the passage of the screw 32, is elongated transversely of the bar to give freedom of swinging adjustment to the hot-plate 20. The hot-plates 19 and 20 have vertical swinging adjustment on their respective pins 21 and 22, and preferably indents are formed in the plates as seats for the pins, the better to keep the hot-plates from binding against the posts.

A suitably insulated terminal block 37 is supported by a plate standard 38, which standard is attached to the top plate 6. The terminal block has binding posts from which conducting wires lead to the respective hot-plate elements, and the binding posts support wires in a cable 39 connecting with a source of current all in the usual manner. A switch 40 affords means for turning the current on and off to and from the toaster.

The electrical end of the toaster is preferably protected and hid by a sheet metal hood 41, attached to the base plate 6. Levers for the discharge of the toasted bread are illustrated in Figs. 1 and 3. A lever pivoted to post 17 has a push-button here shown as a cylinder 42, at the outer end of one arm. The other arm of the lever is bent substantially at right angles to provide a push-member 43 which is back of the toasted bread, so that by pressing on button 42 the lever swings and the member 43 sweeps the toast forwardly out from between its hot-plates.

In the operation of my toaster, assuming that the hot-plates are all in their lowest position and it is desired to insert slices of bread to be toasted; the hot-plates are lifted by pulling up on the knob 33 as far as it will go. That raises crossbar 15 which is held in raised position by the spring-pressed latch-plate 24. That raises the middle hot-plate 19 as far as it will go and a slice of bread (or sandwich) is inserted between it and the lower hot-plate 18. Then, holding a slice of bread in one hand and lifting on knob 33 with the other the top hot-plate 19 is raised sufficiently and the slice of bread is inserted and the top hot-plate is allowed, by releasing knob 33, to descend by gravity upon the bread. Then the front knob 28 is drawn out releasing cross-bar 15, which allows the two upper hot-plates 19 and 20, with a slice of bread between them, to drop by gravity until the plate 19 rests upon the lower slice of bread.

As soon as the bread is toasted the upper hot-plates are raised, as in the beginning, by lifting up on the knob 33, and the toasted bread is discharged by pressing against the discharging lever-knob 42.

I claim:

1. In a toaster, a plurality of hot-plates, means comprising a pair of posts having plate lifting pins which are disengaged from the plates in the lowered positions of the plates, and means for lifting the posts to contact the pins with the plates and lift the plates to separate them for the insertion and removal of slices of bread, and means for contacting the plates with the bread during the operation of toasting by releasing the lifted plates.

2. In a toaster, a plurality of hot-plates, means for retaining them in constant substantial parallelism comprising pins initially detached from the plates, means for separating the hot-plates for the insertion and removal of slices of bread by contacting the plates with the pins, and means for contacting the plates with the bread by releasing the contact of the pins with the plates.

3. In a toaster, a plurality of hot-plates, means for maintaining them normally parallel but angularly adjustable pins initially separate from the plates, means for separating them for the insertion and removal of slices of bread between pairs of said plates by contacting the plates with the pins and means for contacting the plates with the bread during the operation of toasting.

4. In a toaster, a plurality of hot-plates, guides holding them in substantial parallelism, pins on the guides initially detached from the plates said hot-plates being separable on the guides by pressure of the pins upon lifting the guides for the insertion and removal of slices of bread therebetween, and means for contacting the plates with the bread during the operation of toasting by releasing the contact of the pins with the plates.

5. In a toaster, a plurality of stacked hot-plates, guide posts maintaining the stacked relation of the plates, means on the posts initially detached from the plates for liftingly engaging some of the plates, means for lifting the posts, and means for releasing the posts.

6. In a toaster, a base, a frame comprising a plurality of posts supported by the base, a plurality of hot-plates held in a stack by the posts, said posts having members initially detached from the plates to pick up one or more of the plates by contact against the middle of the plates when the frame is lifted, said plates being angularly adjustable with relation to each other on said lifting members.

7. In a toaster, a base, a frame comprising a plurality of posts supported by the base, a plurality of hot-plates held movably in relation to each other in a stack by the posts, said posts having members previously out of contact with the plates, which move into contact with the plates to lift a plurality of the plates when the frame is lifted, means for supporting the frame in lifted position and means for releasing the frame-supporting means.

8. In a toaster, a base having a pair of bosses, a frame comprising a pair of spaced apart posts and cross bars connecting the ends of the posts, said posts passing through openings in respective bosses of the base, a spring-latch locking the frame in raised position of the frame, manual means for releasing the latch, a plurality of hot-plates held in a stack on the bosses by the posts, and means on the posts to support all but the bottom hot-plate when the frame is raised.

9. In a toaster, a base having a pair of bosses, a frame comprising a pair of spaced apart posts and cross-bars connecting the ends of the posts, said posts passing through openings in respective bosses of the base, a spring-latch locking the frame in raised position of the frame, manual means for releasing the latch, a plurality of hot-plates held in a stack on the bosses by the posts, and means on the posts to support all but the bottom hot-plate when the frame is raised, said frame being rockable in the bosses and said hot-plates being rockable on the posts.

10. In a toaster, a pair of posts, a plurality of hot-plates, held in a stock by the posts, said plates being separable one from the other for the placing and discharge of slices of bread, and a lever between each pair of hot-plates pivoted to a post, each having an outwardly extending arm and an opposite bent arm terminating with a member which ejects the bread by a swinging movement of the lever.

In testimony whereof I affix my signature.

CHARLES W. MABEY.